Patented July 2, 1929.

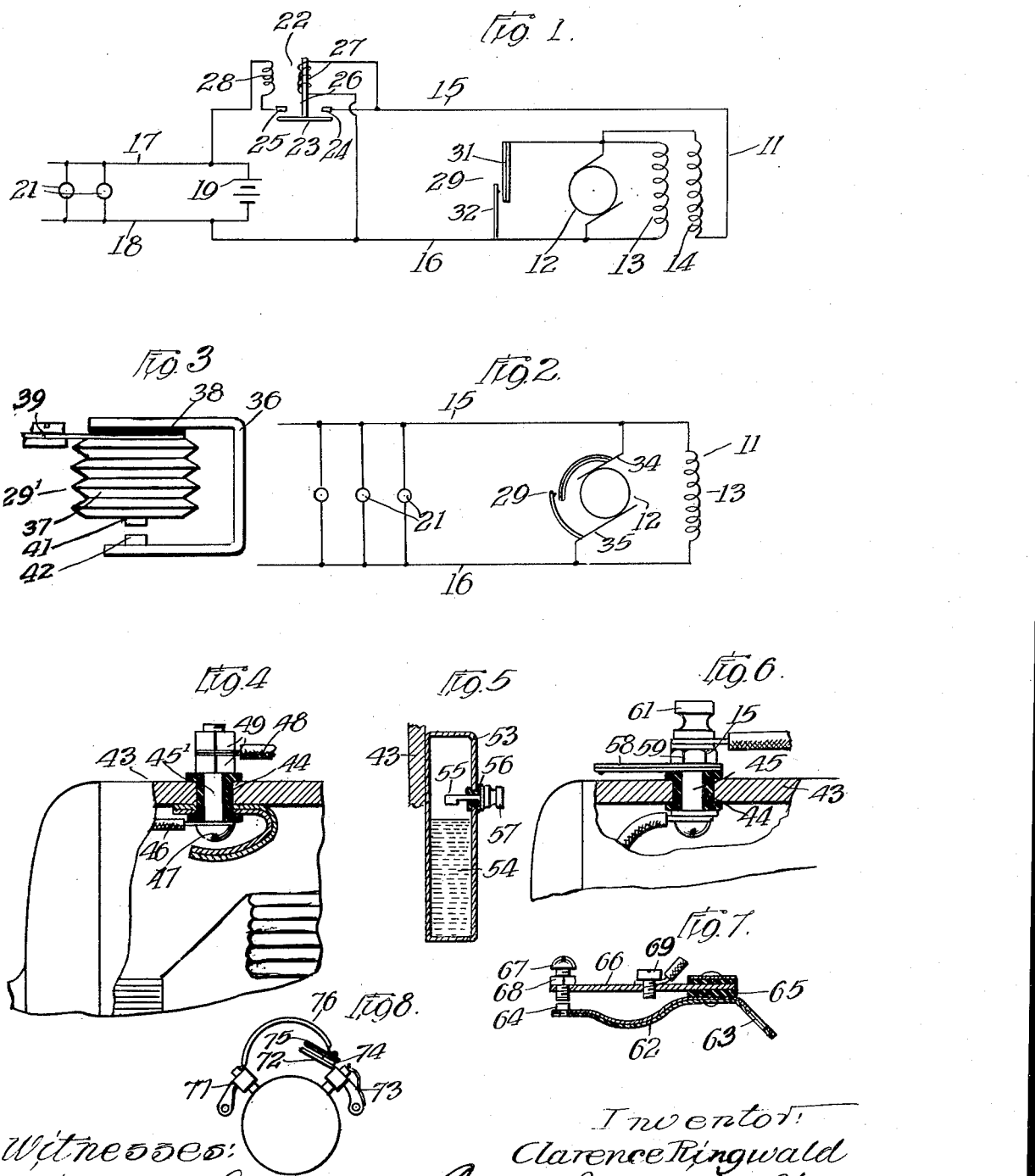

1,718,980

UNITED STATES PATENT OFFICE.

CLARENCE RINGWALD, OF CHICAGO, ILLINOIS, ASSIGNOR OF ONE-HALF TO CHARLES H. CAINE, OF CHICAGO, ILLINOIS.

THERMOSTATIC CONTROL FOR GENERATORS.

Application filed August 8, 1923. Serial No. 656,433.

The present invention relates to a thermostatic control for generators.

More specifically, it aims to provide means for reducing or interrupting the generator output when the temperature of the generator rises beyond a certain point. According to the preferred embodiment, this is accomplished by shortcircuiting or otherwise reducing the current flow through the shunt field and the armature of the generator.

Referring to the accompanying drawing in which I have illustrated a preferred embodiment of my invention:—

Fig. 1 is a circuit diagram of a typical automobile generator installation, illustrating the application of my improved thermostatic control in the circuit.

Fig. 2 is a circuit diagram illustrating the application of the persent thermostatic control to a shunt wound generator;

Fig. 3 illustrates an expanding fluid type of thermostatic control unit;

Fig. 4 illustrates a bi-metallic form of control unit mounted within the generator;

Fig. 5 illustrates a mercury tube type of control unit;

Fig. 6 illustrates a bi-metallic control unit mounted outside of the generator;

Fig. 7 illustrates another arrangement of control unit; and

Fig. 8 illustrates diagrammatically the application of one of my improved control units to the brush holder of a generator.

Fig. 1 illustrates a typical generator installation in an automobile, but is also representative of other generator circuits to which my thermostatic control is applicable.

The generator 11 is of the compound wound type comprising an armature 12, a shunt field 13 and a series field 14. The generator circuit 15—16 is adapted to supply current to a battery and lighting circuit 17—18. The battery 19 is included in this latter circuit, as are also the several lights 21, located at front and rear and on the dash of the car. No detailed showing of the control switches for the lights or for the starter circuit is necessary, as these are all matters within the common knowledge of those skilled in the art.

Any typical form of automatic circuit breaker 22 is interposed in the wire 15 between the generator 11 and the battery circuit 17—18. This circuit breaker may be wound to open the circuit upon a reversal of current flow, or upon a falling off of the voltage below a predetermined value. As shown, a contact arm 23 is adapted to close circuit between the two contacts 24 and 25, this contact arm having a solenoid core 26 actuated by a solenoid winding 27. This solenoid winding is a voltage coil shunted across the generator circuit 15—16. A current coil is included in series between the contact terminal 25 and the battery circuit 17—18.

As shown in this figure, the thermostatic control unit 29 is shunted across the brushes of the generator so as to produce a dead short-circuit on the armature 12 and shunt field 13. The thermostatic control unit 29 is illustrated as consisting of a bi-metallic temperature responsive contact 31 and a stationary contact 32. When the temperature of the generator rises above a predetermined point, the lateral flexing of the bi-metallic strip results in engagement with the stationary contact 32 and places a dead short-circuit across the brushes of the armature 12 and across the shunt field 13. At the instant of the contact, there is a relatively high current flow through this dead short, followed immediately by a dropping off of the generator voltage and output because the shunt field is reduced to a point where it has practically no magnetizing influence, and because the short circuiting of the armature diverts the armature current and prevents it from flowing through the higher resistance series field 14 and generator circuit 15—16. In consequence of this closing of the thermostatic control unit 29, the generator idles along under practically a no-load condition until the temperature falls off to a safe point for efficient operation, whereupon the thermostatic control unit 29 automatically opens the dead short across the armature and the generator resumes normal operation.

Fig. 2 illustrates an application of my invention to a shunt wound generator having direct connection with its load. The generator has a single field winding 13 shunted across the armature 12, and the load, represented by the lights 21 is connected directly across the generator circuit 15—16. The thermostatic control unit is shunted directly across the armature brushes 34 and 35. The closing of this thermostatic control unit nullifies the shunt field 13 and brings the generator down to practically a no-load condition until its normal temperature is restored, in substantially the same manner as described in the preceding circuit.

Fig. 3 illustrates an expanding fluid type of thermostatic unit 29'. A yoke supports an expansible member 37 which may be built up in the form of a sylphon or series of diaphragms secured together and forming a hermetically sealed expansible chamber. This chamber contains a gas or a liquid of any preferred character for producing a rise of pressure in the sylphon or other expansible unit with an increase in temperature. The upper end of the sylphon is supported on the upper arm of the yoke 36, an insulating block 38 intervening between the sylphon and the yoke. A connector terminal 39 is secured between the insulating block 38 and the sylphon 37 to establish an electrical connection with the upper end of the sylphon. The lower end of the sylphon carries a contact terminal 41 which is adapted to engage a contact terminal 42 on the lower arm of the yoke 36. The yoke 36 is secured to the frame of the generator in any suitable manner or location to subject the sylphon 37 to the heat to be measured, and this mounting of the yoke on the generator frame or housing grounds the terminal 42. Consequently, with the expansion of the sylphon 37, the terminal 41 is brought down into engagement with the grounding terminal 42 so as to place the dead short across the armature terminals in the manner described above. In practically all automobile installations, one of the generator terminals is grounded. The natural resiliency of the sylphon 37 will separate the terminals 41 and 42 when the expansible fluid within the sylphon contracts, or a tension spring may be provided for restoring the contact terminal 41.

In Fig. 4 the thermostatic control element is embodied in the form of a bi-metallic contact member mounted within the generator housing. The ungrounded side of the circuit in each generator is usually extended through the generator housing in the form of a binding post or similar connector terminal. As shown in this figure, the generator housing is indicated fragmentarily at 43, and extending through a hole in the upper part of the housing is an insulating bushing 44. A connector bolt 45 passes through the bushing 44, making connection on the inside through wire 46 engaging under bolt head 47, and on the outside through wire 48 engaging between the nuts 49. A strip 51 of bi-metallic composition has an apertured end which is slipped over the bushing 44 and arranged to engage between the lower flange of the bushing and the under side of the generator housing 43. This places this strip 51 in grounded relation to the generator frame. The other end of the contact strip 51 is curved back under the head 47 of the connector bolt 45. The spacing of the outer end of this contact strip from the head 47 of the terminal bolt is such that when the injurious temperatures are developed in the generator, the terminal strip 51 will have moved up ready for contact with the bolt head 47.

A sealed tube 53, containing a charge of mercury 54, may be employed as the thermally responsive element, substantially in the manner illustrated diagrammatically in Fig. 5. This tube may be supported by the generator housing, or may be mounted in any other suitable manner for subjecting the mercury 54 to the temperature to be measured. A contact terminal 55 projects through an insulating bushing 56 in the side wall of the tube, and disposes the terminal part just above the normal level of the mercury 54. This terminal 55 may have any suitable connection through the binding post 57 with the ungrounded side of the circuit. The development of the undesirable temperatures causes the mercury 54 to expand up into contact with the terminal 55, thereby shorting the armature and shunt field, as above described.

In installing the thermally responsive element outside of the generator housing 43, the bi-metallic link 58 may have an apertured end fitting over the outer end of the connector bolt 45 and held firmly to the upper flange of the insulating bushing 44 by a nut 59. The generator circuit wire 15 connects to the bolt 45 between the nut 59 and a thumb screw 61 on the outer end of the bolt. When the injurious temperature is reached, the bi-metallic strip 58 flexes downwardly into contact with the housing 43.

Fig. 7 shows an adjustable form of thermostatic unit applicable to any of the preceding situations. The band or strip 62 of thermostatic metal is provided with an opening 63 at one end for attachment to the frame of the generator, or for attachment to any other preferred point where the thermostatic band will be influenced by the generator heat. A contact terminal 64 is carried on the outer free end of the band 62. An insulating block 65 is mounted on top of the thermostatic band 62 and carries a non-thermal bar 66, mounted in the outer end of which is an adjustable contact screw 67. A lock nut 68 serves to hold the contact screw 67 in any adjusted position. The ungrounded side of the circuit is connected to the bar 66 through the terminal screw 69. The contact screw 67 can be advanced towards or backed away from the contact 64 so as to gauge the short-circuiting function for any approximate heat.

Fig. 8 illustrates more or less diagrammatically, the method of mounting one of these thermostatic control units directly on the brush holder. One terminal member 72 of the thermostatic unit is mounted on a brush holder 73. A block of insulation 74 separates this terminal member from the other terminal member 75. A wire 76 connects this latter terminal member with the other brush holder 77. Either one or both of the terminal members 72 and 75 may be of bi-metallic construction so that they will flex together under undesirable temperatures.

It will be apparent that the thermally responsive members 31, 51, 58 and 62 can be of bi-metallic construction as described, or can be made up in any preferred construction or composition of material for securing this end of short-circuiting the generator when undesirable temperatures prevail therein. It is noteworthy, that by including the thermally responsive elements in the short-circuit straight across the generator, a sharp and instantaneous heating of the thermally responsive element occurs at the first instant of the short circuit, so that intimate closure of the contacts is secured. The first surge of current occurring when the short-circuit is first established has a certain tendency to heat the thermally responsive element, and consequently this element responds by moving the contact terminals into firm engagement, thereby avoiding any subsequent arcing. It will also be noted that this tends to occur in the case of the sylphon 37 in Fig. 3, and in the case of the mercury tube of Fig. 5. The heavy short-circuit current which first surges through the thermostatic control unit will tend to heat the sylphon 37 or the mercury charge 54, so that an efficient closure of the short circuit is obtained. It will be noted that the short circuit is non-fusible within the capacity of the generator so that said short circuit will not be removed while the thermostat is operated.

I claim:—

1. In combination, an electric generator having a shunt field, and means responsive to change of temperature in said generator for short-circuiting the same so long as there exists the condition to which said means is responsive.

2. In combination, a generator, and means responsive to abnormal temperature within the generator for short-circuiting said generator so long as the abnormal temperature prevails.

3. The combination with an electric generator having windings normally effective in the generation of current when said generator is driven, of means responsive to change of temperature in said generator for incapacitating said windings without disconnection thereof from circuit.

4. The combination with an electric generator having windings normally effective in the generation of current when said generator is driven, of means responsive to rise of temperature in said generator for diverting current flow from said windings without opening thereof and to an extent to permit reduction in temperature of said generator and operation of said heat responsive means to permit normal current flow through said windings.

5. In combination with an electric generator having windings normally effective in the generation of normal current flow when said generator is driven, of means responsive to temperature change of said generator, said means becoming effective when the temperature reaches a predetermined limit to shunt said windings to an extent to permit reduction in said temperature below said limit and reopening of said shunt by said heat responsive means.

6. In combination, a generator, a circuit therefor, a current consuming element in said circuit, and means controlled by the heat generated in the generator for short circuiting the generator upon itself and thereby discontinuing the flow of current to said element.

7. In combination with a generator having a main field winding, thermally controlled switching means controlled by the temperature of the generator for opening and closing a short circuit across the generator field winding.

8. In combination, a storage battery and electric translating means connected in parallel, an electric generator, means controlled by the voltage of the generator for connecting it in parallel with the battery, means for preventing the flow of current from the battery to the generator but permitting the flow of current in the other direction, and means controlled by the temperature of the generator for opening and closing a short circuit across the generator winding.

In witness whereof, I hereunto subscribe my name this 3rd day of August, 1923.

CLARENCE RINGWALD.